United States Patent [19]

Blauel et al.

[11] Patent Number: 5,536,523
[45] Date of Patent: Jul. 16, 1996

[54] SPREAD

[75] Inventors: Friedrich Blauel, Argolid, Greece; Matthew F. Murphy, Co. Cork, Ireland; Charles M. Byrne, Argolid, Greece

[73] Assignee: Ogam Limited, Cork, Ireland

[21] Appl. No.: 119,131

[22] PCT Filed: Mar. 18, 1992

[86] PCT No.: PCT/GB92/00499

§ 371 Date: Sep. 20, 1993

§ 102(e) Date: Sep. 20, 1993

[87] PCT Pub. No.: WO92/16111

PCT Pub. Date: Oct. 1, 1992

[30] Foreign Application Priority Data

Mar. 22, 1991 [GB] United Kingdom ............... 9106127

[51] Int. Cl.$^6$ ................................................. A23D 7/00
[52] U.S. Cl. .......................... 426/603; 426/601; 426/602
[58] Field of Search ............................... 426/603, 605, 426/601, 602

[56] References Cited

U.S. PATENT DOCUMENTS

| | | | |
|---|---|---|---|
| 3,397,994 | 8/1968 | Elenbogen et al. | 99/116 |
| 4,292,333 | 9/1981 | Bosco | 426/602 |
| 4,497,843 | 2/1985 | Errass | 426/602 |
| 4,569,846 | 2/1986 | Ohzeki et al. | 426/40 |
| 4,764,392 | 8/1988 | Yasufuku | 426/603 |
| 4,963,385 | 10/1990 | Antrim et al. | 426/602 |
| 5,063,076 | 11/1991 | Fenlayson | 426/602 |
| 5,151,291 | 9/1992 | Tokairin | 426/603 |
| 5,151,451 | 9/1992 | Brown | 426/605 |
| 5,279,847 | 1/1994 | Okonogi | 426/603 |
| 5,288,619 | 2/1994 | Brown | 426/603 |

FOREIGN PATENT DOCUMENTS

| | | |
|---|---|---|
| 0369519 | 5/1990 | European Pat. Off. . |
| 0421504 | 4/1991 | European Pat. Off. . |
| 2027994 | 12/1968 | France . |
| 2244717 | 12/1991 | United Kingdom . |

OTHER PUBLICATIONS

Article Entitled: "Studies on a Soy–Based Low–Fat Spread" 6022 Journal of Food Science 53 (1988) Mar.–Apr., No. 2 Chicago, Illinois, USA.

*Primary Examiner*—Carolyn Paden
*Attorney, Agent, or Firm*—Michael A. Kondzella; Poms, Smith, Lande & Rose

[57] ABSTRACT

A butter-like spread containing 35–80% w/w fat is formed into an oil-in-water emulsion. The fat portion is said to contain 10% w/w saturated fatty acids and 80% w/w unsaturated fatty acids with no trans fatty acids.

8 Claims, No Drawings

SPREAD

FIELD OF THE INVENTION

This invention relates to compositions that can be used in the same way as butter and margarine, and to a process for their preparation.

BACKGROUND OF THE INVENTION

Many non-butter spreads are known, in which it has been attempted to achieve the taste and spreadability of butter, but without its high saturated fat (and often also salt) content. Butter oil contains considerably more than 50% saturated fat.

Liquid vegetable oils such as rape, soya, sunflower and olive oils contain less saturated fat than butter oil. In spreads containing them, however, they are either hydrogenated or supplemented by (an often unspecified amount of) hydrogenated or other hard fats. According to Bailey's Industrial Oil Guide, the percentage of oil that has been transformed into trans-fatty acids in most margarine ranges between 20% and 40%.

Saturation or hydrogenation changes liquid oils into semi-solid materials that are spreadable. In particular, it allows a cheap oil to be turned into a semi-liquid, plastic or solid fat with particular properties of spreadability, shelf-life and texture. However, this hardening process, or the use of hard fats such as palm oil, makes it very difficult to produce a composition that can be spread easily under all likely conditions of use. The product is either too hard at refrigeration temperatures (0°–5° C.) or too soft at ambient temperatures (15°–25° C.).

Hydrogenation also destroys some of the nutritional value of a natural oil. Moreover, if hydrogenation is stopped before completion, when the desired degree of hardening has been achieved, the partially-hardened fats that are formed may be nutritionally more detrimental than fully hardened fats. The trans fatty acids that are formed by partial hydrogenation can cause very rapid increases in blood cholesterol and triglyceride levels. If the diet contains cholesterol, then the effect of trans fatty acids is increased. Further, since high triglyceride levels are associated with cardiovascular diseases, it will be readily appreciated that partial hydrogenation is potentially very dangerous.

It is a fact that the incidence of death from cancer (1 in 30 in 1900 to 1 in 5 in 1980) parallels the increase in consumption of hydrogenated vegetable oils. Cancers have been associated with poor diet. While statistics do not prove that trans and otherwise hydrogenated fatty acids cause cancer, consideration must be given to the vital functions of essential fatty acids which are interfered with by trans fatty acids.

SUMMARY OF THE INVENTION

A novel butter-like spread comprises 35 to 80% w/w fat, in the form of an oil-in-water (o/w) emulsion. The fat content needs and comprises no hydrogenation, and no or a minor proportion thereof is saturated.

The novel product may contain liquid oil as the sole source of fat. Further, the level of (crystallised) fat that is solid at refrigeration temperatures (0°–5° C.) is particularly low. The fat preferably comprises less than 10% w/w saturated fatty acids and/or more than 80% w/w unsaturated fatty acids. Soya protein and/or whey protein can be used as substantially the sole stabilising and/or emulsifying agent.

In the context of this invention, "butter-like spread" means a product which has the plastic characteristics of butter including spreadability and sensation on the palate when eaten. The term "oil" is used herein to describe a fat which is in the liquid state. The words "fat" and "oil" are sometimes used interchangeably in this specification.

A product of this invention is useable (i.e., satisfactorily spreadable) over a wide range of temperature (0°–30° C.) without being excessively hard at the lower temperatures nor excessively soft at the higher temperatures. This is by contrast to the difficulty if not impossibility of producing a product in the traditional manner (namely water-in-oil emulsion) which is sufficiently soft when the level of crystallised fat is above about or sufficiently hard when the level is below about 25%. An advantage of this invention is that the amount of solid fat has little effect on the hardness or spreadability of the product. Furthermore, this product need not soften markedly over the use range. By this we mean the product is virtually as firm (or soft) at 0° C. as it is at 30° C.

DESCRIPTION OF THE INVENTION

The present invention aims at producing spreads which are low in saturated fatty acids and very high in mono, di and polyunsaturated fatty acids. For example, there may be a preponderance of the nutritionally-desirable omega 3 fatty acids. Furthermore, the fats and oils used need not be hydrogenated, interesterified, winterised or modified in any other way. It is possible to use, for example, virgin cold-pressed oils. In this way, natural vitamins and antioxidants can be maintained at the natural levels and cis-fatty acids remain unaltered.

The fat phase of the present invention may be unaltered oil such as evening primrose oil, fish oil, linseed/flax oil, olive oil, sunflower oil, safflower oil, soya oil, rape seed oil or a mixture of any of these or may consist of other fats, including milk fat, depending on the nutritional, physical and other characteristics desired. Fat-replacing agents may be used.

The aqueous phase of the present invention, apart from water, may comprise, for instance, thickening agents and/or gelling agents, stabilising and/or emulsifying agents, flavour compounds, pH-adjusting agents and preservatives. Examples of emulsifiers include proteins, egg yolk, mono and di-glycerides and phospholipids.

The products according to this invention need not be stabilised by the incorporation of substantial amounts of thickening and/or gelling agents. Those thickening and gelling agents which may be used are milk proteins including the whey proteins, soya proteins, gelatin, alginate, agar, carrageenan as well as various gums, starch derivatives and cellulose and its derivatives.

The nature of the novel product is such that a wide variety of ingredients can be incorporated. Such ingredients including colouring agents and flavouring materials, sweet or savoury; specific examples are honey flavour, garlic and/or herb flavour and yeast extract. Again, all these ingredients may be entirely natural.

The present invention aims at producing edible spreads of good spreadability over wide use-ranges. To this end, it is preferred that the fat phase contains a low level of crystallised fat, i.e., preferably less then 30%, more preferably not greater than 20%, and most preferably 0–10%. The solid fat content of the fat phase can be conveniently determined by measuring, at the relevant temperature, e.g., 0°–5° C. (or at 30°), the NMR value and converting this to % solid fat, as described in J. Dy. Res. (1990) 57: 265–270.

An important feature of the novel spread is that no solid fat is necessary. Winterisation could be used to remove solid fat, but that is equally unnecessary. The fat (which preferably consists essentially of triglycerides) may be fully liquid at the use temperatures. Specifically, the fat may be fully liquid at 0° C. or lower. In general, there may be different amounts of hard fat at different temperatures, without compromising the advantages of this invention.

The characteristic mouth-feel of butter which is possible with this invention is achieved by both the overall content of fat and the distribution and degree of clumping of the fat globules. By decreasing fat globule size, the viscosity and mouth-feel can be controlled. The mouth-feel may also be adjusted, especially in products of reduced fat content (typically less than 60%) by the present of viscosity-enhancing agents in the aqueous phase. Examples of viscosity-enhancing agents are alginates, gums and modified cellulose starches.

The product may be prepared by any convenient means. Preferably, however, its production is carried out by preparing the aqueous phase (with the exception of any acid) and slowly adding the liquid fat with constant mixing. The acid is typically added after a considerable proportion of the fat has been added.

Part or all of the acid may be incorporated by replacement of part of the aqueous phase by yoghurt. If yoghurt is used, it is preferably added after approximately 50% of the oil has been incorporated into the remainder of the aqueous phase.

The invention is illustrated by the following Examples. Here and throughout the specification, percentages are by weight based on the total weight of the spread.

EXAMPLE 1

| Oil Phase: | |
|---|---|
| Pure low erucic acid rape seed oil (cold pressed) | 70% |
| Aqueous Phase: | |
| Soya protein isolate | 0.8% |
| Sodium chloride | 0.2% |
| Citric acid | 0.1% |
| Sorbic acid | 0.2% |
| Guar and xanthan gums | 0.5% |
| Natural butter flavour | 0.1% |
| Annatto | 0.1% |
| Water to | 100% |

All the aqueous phase ingredients (except sodium chloride, sorbic and citric acids) were thoroughly mixed. The liquid oil was then added slowly, at 20° C., with continuous mixing, until about 75% of the oil had been introduced. The sodium chloride, sorbic and citric acids were then added in powder form. The remainder of the oil was then added slowly while mixing, and mixing was continued until thoroughly blended.

EXAMPLE 2

The procedure of Example 1 was repeated, but using:

| Oil Phase: | |
|---|---|
| Pure sunflower oil | 60% |
| Aqueous Phase: | |
| Soya protein isolate | 0.6% |
| Whey protein isolate | 0.2% |
| Sodium chloride | 0.8% |
| Citric acid | 0.1% |
| Sorbic acid | 0.2% |
| Guar, xanthan and carob gums | 0.8% |
| Modified starch | 1.0% |
| Maltodextrin | 0.2% |
| Nature identical butter flavour | 0.1% |
| Annatto | 0.12% |
| Curcumin | 0.05% |
| Water to | 100% |

EXAMPLE 3

The procedure of Example 1 was repeated, but using:

| Oil phase: | |
|---|---|
| Pure olive oil | 40% |
| Aqueous phase: | |
| Soya protein isolate | 0.6% |
| Whey protein isolate | 0.4% |
| Sodium chloride | 0.8% |
| Citric acid | 0.1% |
| Sorbic acid | 0.2% |
| Guar, xanthan and carob gums | 1.0% |
| Modified starch | 1.0% |
| Maltodextrin | 2.0% |
| Butter flavouring | 0.1% |
| Beta carotene | 0.1% |
| Water to | 100% |

EXAMPLE 4

The procedure of Example 1 was repeated, using the materials of Example 2, except that the oil phase comprised 50% pure low erucic acid rapeseed oil and 10% milk fat, and that this oil phase was heated to 40° C., so that the fat was fully liquid, before adding it.

The following are some characteristics and advantages of the invention:

the product may contain less than 25%, e.g., 0–5%, crystallised fat, and a butter-like o/w spread can be achieved with liquid oil only;

the product is spreadable over a wide use range, typically 0°–30° C.;

the ideal spreadability of the product can be maintained over the use range;

saturated fatty acids in the product may be at any desired level (preferably below 10%);

mono, di and poly-unsaturated fatty acids may be at any desired level;

the viscosity of the components used in the process may be controlled depending on the degree of blending given to the oil/aqueous phases;

the mouth-feel of the product may be controlled by addition of suitable gelling and/or thickening agents;

the o/w product may be achieved by simply mixing the liquid fat with a suitable aqueous phase using a high speed mixer;

it is not necessary to modify the fats by hydrogenation, thus ensuring that all the cis unsaturated fatty acids are maintained and no trans fatty acids are formed and no new fatty acids are formed;

interesterification is not needed to modify the fats, thereby ensuring that all the naturally-occurring triglycerides in the fat are maintained, and no high-melting triglycerides are formed which may adversely affect mouth-feel;

no fractionation or winterisation is needed, thereby maintaining naturally-occurring triglycerides at their original levels;

heating above 45° C. is not required;

no chemical processing is needed, thereby obviating the presence of any chemical residues, e.g., oxidation by-products or catalysts, in the product;

the product and process are so completely natural that, or example, virgin cold-pressed olive oil may be used or is present in the product in unaltered form (in particular, the nutritional qualities of, say, olive oil and omega-3 and other cis highly unsaturated fats are not compromised);

all the naturally-occurring vitamins, antioxidants and other desirable trace materials in the oil are completely retained;

the packaged product does not require refrigeration until opened, and at that stage a temperature of 0°–5° C. is ideal for storage;

where natural antioxidants (e.g., cold-pressed unrefined oils) are present, the product will be less subject to oxidation by light;

the method of manufacture is simpler than the traditional Votator type method of manufacture of traditional spreads;

an o/w emulsion is produced which is superior in use, both as a spread and in the mouth, to traditional w/o spreads;

the product has a cooler palate feel than traditional w/o spreads due to the continuous water phase; and the product is more economical in use (spreads better) than other spreads.

We claim:

1. A butter-like spread comprising 35 to 80% w/w fat, in the form of an oil-in-water (o/w) emulsion in which the percentages of said fat are based upon the weight of said emulsion, in which said fat comprises less than 10% w/w saturated fatty acids and/or more than 80% w/w unsaturated fatty acids and contains no hydrogenated fat containing trans fatty acids, and which has the plastic characteristics of butter over the temperature range of 0° C. to 30° C.

2. A spread according to claim 1, which comprises soya protein and/or whey protein as substantially the only stabilising or emulsifying agent.

3. A spread according to any preceding claim, wherein the fat is predominantly or wholly liquid at 0°–5° C.

4. A spread according to claim 3, which comprises at least 16% w/w water.

5. A process for producing a butter-like spread in the form of an off-in-water (o/w) emulsion, which comprises emulsifying together (a) a fat or oil phase which, at 0°–5° C., contains no or substantially no solid fat; and (b) an aqueous phase containing water-soluble and dispersible ingredients;

to produce an oil-in-water emulsion containing 35 to 80% w/w fat in which sad fat comprises less than 10% w/w saturated fatty acids and/or more than 80% w/w unsaturated fatty acids and contains no hydrogenated fat containing trans fatty acids, and which has the plastic characteristics of butter over the temperature range of 0° C. to 30° C.

6. A process according to claim 5, wherein said emulsion comprises soya protein and/or whey protein as substantially the only stabilizing or emulsifying agent.

7. A process according to either of claims 5 or 6, wherein sad emulsion comprises at least 16% w/w water.

8. A process according to claim 7, wherein emulsifying is accomplished by slowly adding ingredient (a) to ingredient (b), with continuous mixing.

* * * * *